April 13, 1965

L. SOLET 3,178,008

STORING AND FEEDING DEVICE

Filed Oct. 3, 1963

INVENTOR.
LOUIS SOLET

BY

Curtis, Morris and Safford
ATTORNEYS

April 13, 1965

L. SOLET 3,178,008

STORING AND FEEDING DEVICE

Filed Oct. 3, 1963

INVENTOR.
LOUIS SOLET

BY
Curtis, Morris and Safford
ATTORNEYS

United States Patent Office 3,178,008
Patented Apr. 13, 1965

3,178,008
STORING AND FEEDING DEVICE
Louis Solet, Gibraltar, Mich., assignor to Ajem
Laboratories, Inc., Livonia, Mich.
Filed Oct. 3, 1963, Ser. No. 313,688
4 Claims. (Cl. 198—43)

This invention relates to a storing and feeding device. More particularly, the invention relates to a feeding and storage device comprising a storage section with a sloping coast-down section and an elevator section.

Such storing and feeding devices are particularly useful in automated industrial operations where it is desirable to maintain a constant supply of parts for given operation. Conventional conveyor systems, when used for supplying such automated machinery or processes, can, by malfunction or by lack of attention, interrupt the flow of parts so as to cause serious loss. In some conveyor operations, an entire sequence of assembly parts would be lost if a single component part was missing from the feed belt. Thus, a full cycle of the automated equipment being supplied would be unproductive each time one part is missed, and the unit cost of production would thus be materially increased. Furthermore, many machines are designed for balanced operation fully loaded, and their operation is impaired if they are unbalanced by omitting a part.

Thus, it is desirable to provide means for providing storage apparatus adapted to provide a ready reserve of parts and feed them to the machines, without regard to temporary interruptions in the supply of such parts beyond the reserve.

It is an object of the present invention to provide an easily maintained parts storage apparatus. It is also an object of this invention to provide a storage apparatus wherein the parts to be stored are subject to a minimum of mechanical abuse. It is a further object of the invention to provide a storage apparatus which is adapted to feed other equipment.

These objects have been substantially achieved by a storage and feeding device as herein set forth, comprising an elevator section having vertical tracks and multi-track helical storage and coast-down section from which, respectively, parts may be exited into unoccupied spaces on another elevator track, thus assuring that no voids will occur at the machine-supplying end of the apparatus, unless there is such a prolonged failure of the supply of parts as to use up the stored reserve of parts. This unit has a recycling action whereby the same part may probe in a number of places for voids in the stored reserve supply before finally entering such a void or exiting to the machine being supplied.

Figure 1:
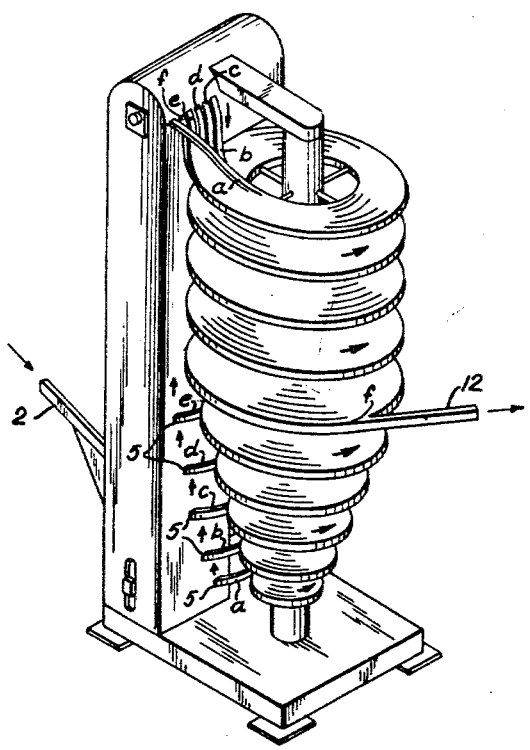
FIGURE 1 is an isometric view of a feeder-storage unit embodied by the present invention.
Figure 3:
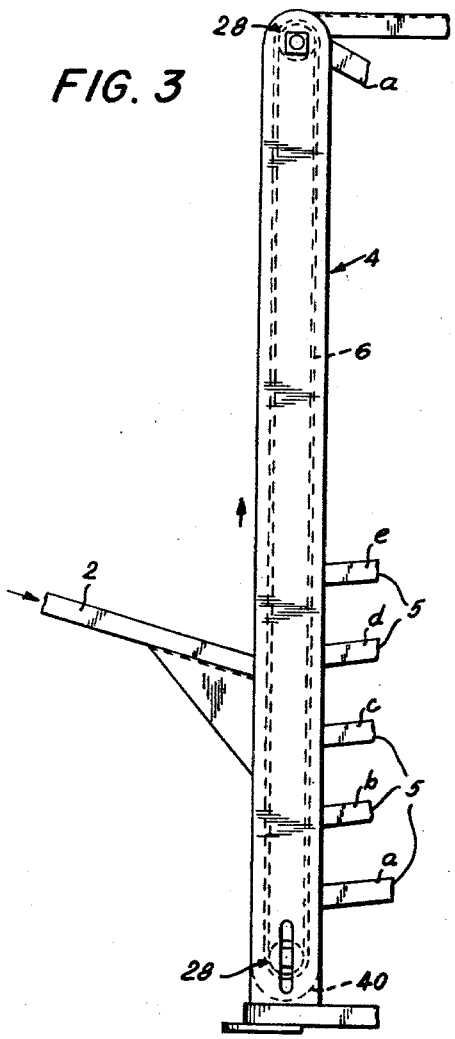
FIGURE 3 is a side elevation of the unit, showing the elevator with the storage slide broken away.
Figure 2:
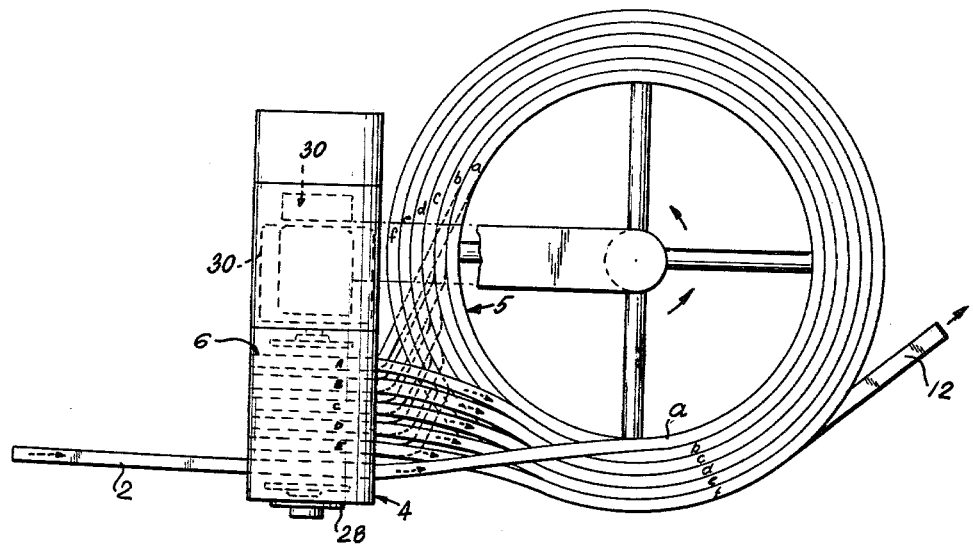
FIGURE 2 is a plan view from the top of the unit showing the paths followed by parts in the unit.

Referring to FIGURE 2, parts are supplied to the storage unit through inlet chute 2 and conveyed thereon to the innermost helical track $a$ of the storage device. On this track, the part descends until it is diverted to the elevator track A of the apparatus at the righthand conveying position on the elevator belt 6 (as viewed in FIGURES 1 and 4). The helical track is of such cross-section as to maintain the part in its most desirable position for transit down the track.

If the elevator track A is full, the part is merely held back by the parts already in the successive positions, and rests on the gravity track $a$, until a vacant space on the elevator A comes up to receive it. Until then, the part rests against the filled elevator track, normally being disturbed, i.e. continuously nudged, by the passing parts on the elevator track. This nudging is advantageous inasmuch as it aids gravity feed action by causing transmission of mechanical vibration along the parts storage track, promoting the gravity flow of said parts and helping to avoid any flow stoppage. When a vacant space does appear, the part enters and is elevated to the top of the elevator, where it falls into the next helical track $b$ of the storage device.

Again the part rolls or slides down the helical track and is diverted to one of the line of elevator compartments 4 through diverter chute 5 (see FIGURE 1), this time to track B. Again the part must wait until a vacancy or empty position appears on the elevator belt, when it is once again carried to the top and deposited on the next helical track $c$.

In normal operation vacancies will appear in the elevator tracks each time a machine has accepted a part from exit chute 12, thus causing the parts in the outer helical track to move forward and make room for a part to exit from the elevator track at $f$. This position will, after the elevator track has advanced sufficiently, be filled from $5e$, thus causing the parts in the next inner helical chute to advance and so on until a part is admitted through chute $5a$ and then from supply chute 2. Thus, it is seen that the elevator tracks and helical tracks are connected in series, alternating to provide a mechanism where parts may be accumulated on each of the helical tracks until an empty position on the appropriate elevator comes along, and then is carried on to the next sequential helical track, etc., the last helical track terminating in an exit chute 12 from which the parts may be supplied to the machines.

Figure 4:
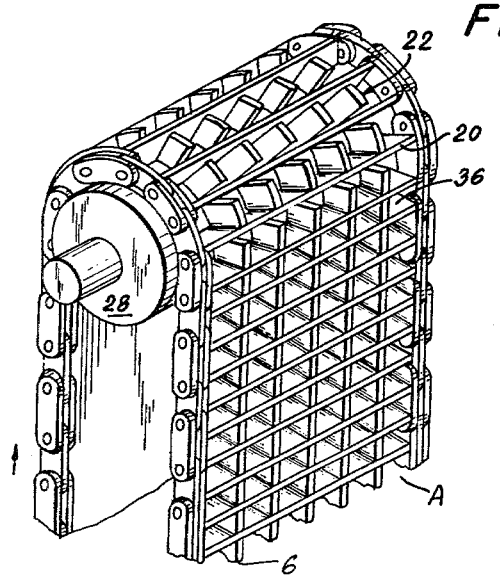
FIGURE 4 is an isometric view of the elevator belt showing ribs and flights adapted for holding parts in transit.

Referring to FIGURE 4, parts are retained in position on elevator belt 6 by transverse retaining means such as flights 20 and vertical positioning means such as ribs 22.

Elevator belt 6 is contained in a housing 26 and revolves around drums 28, one of which is driven, as by electric motor 30.

Flights 20 and ribs 22 on elevator belt 6 are spaced in such a way as to provide compartments 36, each sufficient in size, to accommodate one of said parts. However, compartments 36 are small enough in relation to the part and the size of the helical tracks to assume alignment of the part with the helical track, and the transverse flights 20 slope slightly so as to hold the parts in their respective cells while moving up on the back of the belt, but to encourage them to roll or slide out onto the chutes $a$, $b$, $c$, etc. when they have passed into registry with the chutes.

In storing parts which are not cylindrical, the restricted size of the compartments has the additional utility of not allowing the parts to deviate from the orientation in which it is desired that they be handled, e.g., that in which they may easily descend on the helical tracks.

Likewise, elevator housing 4 is adapted to provide restraint on the parts being conveyed, maintaining them in position in their respective compartments 36. This function of the elevator housing 4 may be supplemented by the addition of a lower restraining member 40 which may be used to maintain the parts in place during the 180° turn at the bottom of the belt 6. Of course, in some cases, the restraint of an elevator compartment will not be required; in such situations, restraining member 40 may be used alone when it is desired to restrain the parts on the 180° turn at the bottom of the belt.

The helical tracks are advantageously pitched at about 6° from the horizontal when, as in this embodiment, the apparatus is to handle smooth, rollable parts.

Since the supply of parts to the storage device normally exceeds the number of parts that the machine being fed from the storage device will accept per unit time, it may be seen that under normal conditions the storage machine will be full or very nearly full and movement of parts will be restricted to movement necessary for replacing those parts fed to the process line from exit chute 12, and progressively replacing those parts in the vacancies left in the supply line.

A feeding control mechanism may be used in conjunction with exit chute 12, but as will be clear from the above, it is not essential.

In this application and accompanying drawings, I have shown and described a preferred embodiment of my invention and have suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as may be best suited to the condition of a particular case.

For example, the number of spiraling tracks may be greater or less than the six illustrated and, of course, the number of vertical conveying positions on the belt elevator may be changed to provide for the greater or smaller number of positions required.

The pitch of the spiraling chutes may be varied from the 6° to the horizontal, which we have found best with bearing cups and other parts that roll freely. As is readily understood by those skilled in the art, this pitch may be varied substantially depending primarily on the resistance of the parts to rolling or sliding. Furthermore, rollers and vibrating means may be employed on the chutes to assure smooth movement for parts which have little or no tendency to roll at the pitch of the equipment.

In some instances, it may be desirable to have loader chute 2 "twisted" about its directional line so as to turn the parts up on edge in order to position for rolling or sliding parts which have been received into the chute in a less favorable position. For example, a cylinder received with its axis vertical would be transferred to a rollable position with its axis normal to force exerted by gravity.

Where dusty or other conditions exist, the enclosure of the helical tracks is advisable. They may be enclosed with transparent or opaque materials.

The vertical ribs which provide for the vertical division of the elevator belt 6 may be replaced by other suitable dividing means. For example, vertical ribbing inside of the elevator housing 4 provides a suitable dividing means when such ribbing is sufficiently proximate to the belt to stop horizontal movement of the parts on the belt flights 20.

I claim:

1. A storage and feeding device for providing a continuous supply of parts to a station comprising a primary inlet, an elevator section comprising vertical lifting means and having a secondary inlet in a lower portion thereof and an elevator outlet in a higher portion thereof, a sloping track adapted for transit and storage of said parts, a diverter chute, an exit chute, said sloping track communicating between said elevator outlet and said diverter chute, said diverter chute communicating with said secondary inlet forming means for recirculating parts through said elevator section and said storage track, and said exit chute forming a path for exiting parts to the position being supplied.

2. A storage and feeding device for providing a continuous supply of parts to a station comprising a primary inlet, an exit chute, and between said inlet and exit chute (1) an elevator section comprising a plurality of vertical lifting and recirculating sections, (2) a storage section comprising a plurality of sloping tracks, and (3) diverter chutes, said lifting and recirculating sections and said sloping tracks being connected by said diverter chutes to form a serial passage for parts through said device from said primary inlet to said exit chute.

3. A storage and feeding device as in claim 2 wherein said sloping tracks are helical.

4. A storage and feeding device as in claim 2 wherein said lifting and recirculating sections comprise flights and ribs forming compartments for parts.

References Cited by the Examiner
UNITED STATES PATENTS 2,873,020   2/59   Kay _____ 198—103

SAMUEL F. COLEMAN, *Acting Primary Examiner.*

WILLIAM B. LA BORDE, *Examiner.*